(12) United States Patent
Kosht et al.

(10) Patent No.: US 8,049,158 B2
(45) Date of Patent: Nov. 1, 2011

(54) PHOTONIC PROXIMITY SENSOR AND SCALABLE PHOTONIC SENSING SYSTEM

(75) Inventors: Danial L. Kosht, Gaylord, MI (US); Steve M. Emo, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 354 days.

(21) Appl. No.: 12/109,080

(22) Filed: Apr. 24, 2008

(65) Prior Publication Data

US 2009/0266977 A1  Oct. 29, 2009

(51) Int. Cl.
   *G02F 1/01* (2006.01)
   *G06M 7/00* (2006.01)
(52) U.S. Cl. .................... 250/225; 250/221
(58) Field of Classification Search .......... 250/225, 250/221, 227.11, 227.14, 559.29; 385/6; 359/280, 281, 282, 283, 483.01, 484.01
See application file for complete search history.

(56) References Cited

U.S. PATENT DOCUMENTS

| | | | | |
|---|---|---|---|---|
| 4,529,875 A | * | 7/1985 | Brogardh et al. | ........ 250/227.23 |
| 4,728,178 A | | 3/1988 | Gualtieri et al. | |
| 4,843,232 A | | 6/1989 | Emo et al. | |
| 4,969,736 A | | 11/1990 | Slotwinski | |
| 5,149,962 A | * | 9/1992 | Maurice | .................... 250/227.17 |
| 5,434,934 A | * | 7/1995 | Togawa et al. | ..................... 385/6 |
| 5,617,022 A | * | 4/1997 | Baruch | ......................... 324/175 |
| 5,818,221 A | * | 10/1998 | Baruch | ......................... 324/175 |
| 2006/0237636 A1 | * | 10/2006 | Lyons et al. | .................. 250/228 |

FOREIGN PATENT DOCUMENTS

| | | |
|---|---|---|
| JP | 02-236103 A | 9/1990 |
| JP | 06-028609 U | 4/1994 |
| JP | 09-101104 A | 4/1997 |
| JP | 63-009163 U | 1/1998 |

OTHER PUBLICATIONS

Kessler, Bradley, et al., Optical Closed-Loop Flight Control Demonstration, NASA Contractor Report 204139, Aug. 1997.
PCT International Search Report for PCT/US2009/041054 mailed Jan. 7, 2010.

* cited by examiner

*Primary Examiner* — Que T Le
*Assistant Examiner* — Pascal M Bui Pho
(74) *Attorney, Agent, or Firm* — Ingrassia Fisher & Lorenz, P.C.

(57) ABSTRACT

A photonic proximity sensor and photonic sensor system are provided. The photonic proximity sensor includes a first light source, a second light source, and a magneto-optic device. The magneto-optic device receives light emitted from the first and second light sources, and is responsive to variations of a magnetic field to rotate the light from one of the sources significantly more than the light from the other light source.

16 Claims, 5 Drawing Sheets

PHOTONIC PROXIMITY SENSOR AND SCALABLE PHOTONIC SENSING SYSTEM

TECHNICAL FIELD

The present invention generally relates to a proximity sensor and sensing system, more particularly, to a photonic proximity sensor and scalable photonic sensing system that may include the photonic proximity sensor.

BACKGROUND

Proximity sensors are used in myriad devices, systems, and environments to sense the position or relative proximity of one or more objects. For example, proximity sensors may be used in manufacturing, security, robotic, and vehicular environments to determine the position of various objects and, in some instances, control one or more components. Proximity sensors are typically configured as binary-type switches that open or close an electrical circuit when an object contacts, or comes within a predetermined distance of, the sensor.

Proximity sensors are also variously configured and sense object position or relative proximity using various physical phenomena. For example, proximity sensors have been configured to sense object position or relative proximity based on capacitance, inductance, acoustics, electromagnetism, and infrared and optical light. Although each of these types of proximity sensors are generally accurate, safe, and reliable, each suffers certain drawbacks. For example, these sensor types can be susceptible to electromagnetic interference (EMI) and/or sensitive to temperature variations.

In addition to the above-noted drawbacks associated with proximity sensors, when these sensors, and other sensors that use the same or different type of physical phenomena, are implemented as part of a sensing suite, many times different phenomena are used to provide feedback on the various properties being sensed (e.g., speed, pressure, position, etc.). This can increase the complexity in the interface electronics and hinder economies of scale in sensing element and system production.

Hence, there is a need for a proximity sensor that is accurate, safe, and reliable, and that is less susceptible to EMI and/or less sensitive to temperature variations, at least as compared to current devices. There is also a need for a sensing system with interface electronics that are relatively less complex and/or do not hinder production economies of scale. The present invention addresses one or more of these needs.

BRIEF SUMMARY

In one embodiment, and by way of example only, a photonic proximity sensor includes a first light source, a second light source, a magneto-optic device, a target, a first photodetector, and a position determination circuit. The first light source is operable to emit first light of a first wavelength and at a first duty cycle. The second light source is operable to emit second light of a second wavelength and at a second duty cycle. The magneto-optic device is coupled to receive the first light and the second light, is configured to polarize the first light and the second light, and is responsive to variations of a magnetic field to rotate the polarized first light. The target is movable relative to the magneto-optic device to cause the variations of the magnetic field. The first photodetector is coupled to receive at least the polarized first light and is operable, in response thereto, to supply a first signal of a first amplitude magnitude that varies at least with the rotation of the polarized first light.

In another exemplary embodiment, a photonic sensor system includes a plurality of photonic sensors and an interface module. Each of the photonic sensors is configured to sense a physical phenomenon that differs from that of at least one other photonic sensor, and each photonic sensor includes a magneto-optic device that is responsive to variations of a magnetic field, caused by the physical phenomenon it is configured to sense, to rotate polarized light. The interface module is coupled to each of the photonic sensors, and is responsive to at least the rotated polarized light received from each photonic sensor to supply a plurality of signals representative of each sensed physical phenomenon.

Other desirable features and characteristics of the present invention will become apparent from the subsequent detailed description and appended claims, taken in conjunction with the following drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
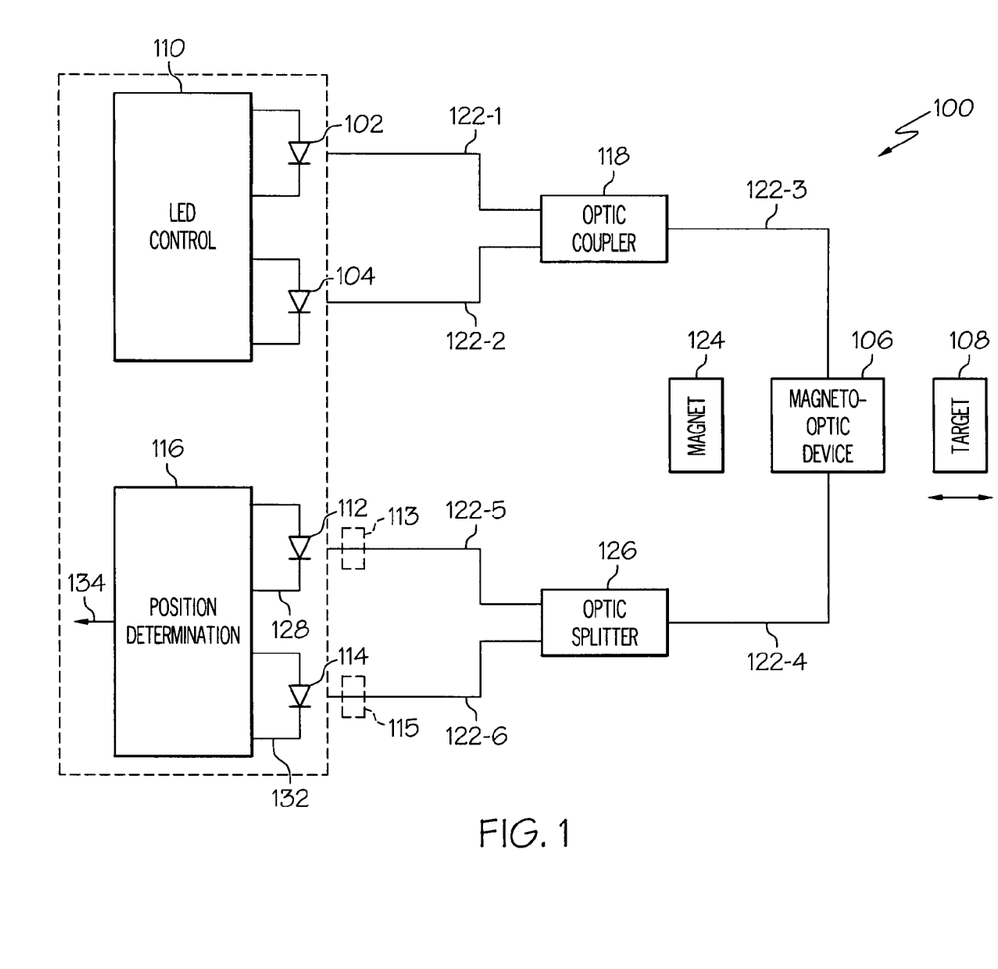
FIG. 1 is a functional block diagram of an exemplary embodiment of a photonic proximity sensor.

Turning now to FIG. 1, a functional block diagram of an exemplary photonic proximity sensor 100 is depicted, and includes a first light source 102, a second light source 104, a magneto-optic device 106, a target 108, a first photodetector 112, a second photodetector 114, and a position determination circuit 116. The first light source 102 and the second light source 104 are each operable, when appropriately energized, to emit light. Preferably, as FIG. 1 depicts, each light source 102, 104 is implemented using one or more LEDs (light emitting diodes). However, the light sources 102, 104, when appropriately energized, emit light of different wavelengths. In particular, the first light source 102 is operable to emit first light of a first wavelength, and the second light source 104 is operable to emit second light of a second wavelength. The reason for this will become more apparent from the subsequent discussions.

The first and second light sources 102, 104 are each coupled to a control circuit 110 that controls the manner in which each light source 102, 104 is energized. It is noted that the control circuit 110 may be formed as part of the same device as the position determination circuit 116. The control circuit 110 preferably energizes the first and second light sources 102, 104 such that the first light source 102 emits pulses of the first light at a first duty cycle, and the second light source 104 emits pulses of the second light at a second duty cycle. Most preferably, the control circuit 110 is configured so that the first and second duty cycles are equal, and that the first light and second light pulses are emitted 180-degrees out of phase. The reason for this will also become apparent from subsequent discussions. In any case, the first light and the second light are supplied to the magneto-optic device 106.

The magneto-optic device 106 is coupled to receive the first light and the second light, preferably via an optic coupler 118. More specifically, in the depicted embodiment the optic coupler 118 is coupled between the first light source 102, the second light source 104, and the magneto-optic device 106, via a plurality of fiber optic cables 122. As FIG. 1 additionally depicts, one fiber optic cable 122-1 is coupled between the first light source 102 and the optic coupler 118, another fiber optic cable 122-2 is coupled between the second light source 104 and the optic coupler 118, and another fiber optic cable 122-3 is coupled between the optic coupler 118 and the magneto-optic device 106. It will be appreciated that this particular means of coupling the magneto-optic device 106 to receive the first light and the second light is merely exemplary of a particular embodiment and that other means and methods could be used.

Figure 3:
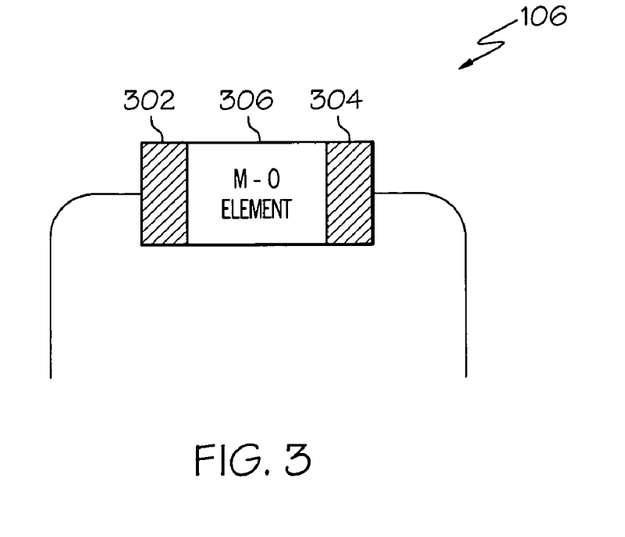
FIG. 3 depicts a simplified representation of a magneto-optic device that may be used to implement the sensors of FIGS. 1 and 2.

No matter the particular manner in which the first and second light are conveyed to the magneto-optic device 106, this device 106 is configured to polarize both the first light and the second light, and is responsive to variations of a magnetic field to rotate the polarized first light. To do so, the magneto-optic device 106, an embodiment of which is depicted more clearly in FIG. 3, includes a polarizer 302, an analyzer 304, and a magneto-optic element 306. The polarizer 302 and analyzer 304, which are both preferably implemented using thin film polarizers, are each configured, using well known principles, to linearly polarize the light it receives by passing only specific polarization states of the received light. Thus, the polarizer 302 linearly polarizes the first light and the second light, and supplies the linearly polarized first and second light to the magneto-optic element 306. The analyzer 304 further linearly polarizes the first and second light it receives from the magneto-optic element 306, and supplies the further linearly polarized first and second light to the first and second photodetectors 112, 114.

Figure 4:
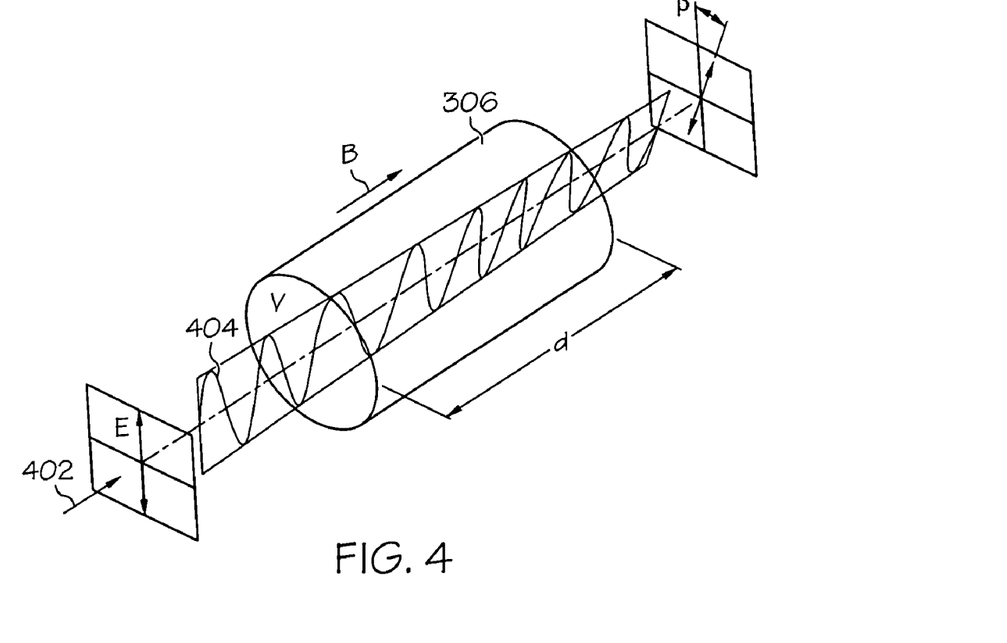
FIG. 4 depicts a magneto-optic element that may be used to implement the sensors of FIGS. 1 and 2, illustrating the principle of operation of the element.

Referring momentarily to FIG. 4, which depicts an exemplary embodiment of the magneto-optic element 306, the principle of operation of the magneto-optic device 106 will be described. The magneto-optic device 106, as previously noted, is configured to rotate linearly polarized light propagating through it via the Faraday effect. That is, when a magnetic field (B) is applied parallel to the direction of light propagation 402, the plane of the linearly polarized light 404 is rotated. The angle of rotation ($\beta$) of the linearly polarized light 404 will depend on the magnetic field density, the length (d) of the magneto-optic element 306, the Verdet constant (v) of the magneto-optic element 306, and the wavelength of the linearly polarized light 404. It is noted that because the magneto-optic element 306 is wavelength sensitive, the magneto-optic device 106 is configured to be significantly more sensitive to the first light than to the second light (or vice-versa). The reason for this will also become apparent from subsequent discussions.

Returning once again to FIG. 1, it is seen that the target 108 is movable relative to the magneto-optic device 106. As FIG. 1 further depicts, a magnet 124 is disposed adjacent the magneto-optic device 106. The magnetic field from the magnet 124 is thus applied to the magneto-optic element 206 of the magneto-optic device 106. The movable target 108, which is preferably comprised at least partially of a ferrous material, is disposed in a manner that it will influence the magnetic field applied to the magneto-optic device 106. More specifically, movement of the target 108 will cause variations of the magnetic field, and more particularly the magnetic field density, applied to the magneto-optic device 106. As noted above, the angle of rotation ($\beta$) of linearly polarized light propagating through the magneto-optic element 306 will vary with the applied magnetic field density. Hence, as may be appreciated, the angle of rotation ($\beta$) of one of the first light or the second light will vary in response to movement of the target 108. It will be appreciated that in some embodiments, the magnet 124 could be formed integrally with the target 108.

Before proceeding further, it is noted that for consistency in subsequent discussions, and for ease of further description, it is assumed that the magneto-optic device 106 is significantly more sensitive to the wavelength of the first light than to the wavelength of the second light. Thus, linearly polarized first light is rotated, in response to magnetic field variations, significantly more than linearly polarized second light, if linearly polarized second light is rotated at all. It is additionally noted that the target 108 may be mounted on or otherwise coupled to a non-illustrated device. For example, the target 108 may be coupled to a door, an aircraft flight control surface, a lever, or any one of numerous other objects or devices.

Returning once again to the description, and with continued reference to FIG. 1, the linearly polarized first and second light that are emitted from the magneto-optic device 106 are supplied to the first photodetector 112 and the second photodetector 114, respectively, via an optic splitter 126. More specifically, in the depicted embodiment, the optic splitter 126 is coupled between the magneto-optic device 106, the first photodetector 112, and the second photodetector 114, also via a plurality of fiber optic cables 122. As seen, one fiber optic cable 122-4 is coupled between the magneto-optic device 106 and the optic splitter 126, another fiber optic cable 122-5 is coupled between the optic splitter 126 and the first photodetector 112, and another fiber optic cable 122-6 is coupled between the optic splitter 126 and the second photodetector 114. It will be appreciated that this particular means of coupling the magneto-optic device 106 to the first and second photodetectors 112, 114 is merely exemplary of a particular embodiment and that other means and methods could be used.

No matter the particular manner in which the first and second photodetectors 112, 114 are coupled to receive the polarized first and second light, respectively, from the magneto-optic device 106, the first photodetector 112 is responsive to the polarized first light to supply a first signal 128 of a first amplitude magnitude, and the second photodetector 114 is responsive to the polarized second light to supply a second signal 132 of a second amplitude magnitude. From the previous descriptions, it may be appreciated that the first and second amplitude magnitudes will vary with the angle of rotation ($\beta$) of the polarized first and polarized second light, respectively. It may additionally be appreciated that variations of the first amplitude will be significantly greater than variations of the second amplitude, if second amplitude variations occur at all in response to magnetic field variations. In any case, the first and second signals 128, 132 are both supplied to the position determination circuit 116.

The position determination circuit 116 is coupled to receive the first signal 128 and the second signal 132 from the first photodetector 112 and the second photodetector 114, respectively. The position determination circuit 116, in response to the first 128 and second 132 signals, supplies a position signal 134 of a third amplitude magnitude that is representative of the position of the target 108. Although the position determination circuit 116 may be variously configured to implement this function, in the depicted embodiment the position determination circuit 116 is configured as a summer circuit that sums the first and second signals 128, 132. Moreover, in some embodiments the position determination circuit 116 and LED control circuit 110 may be integrally formed or otherwise coupled together and configured to operate synchronously.

As FIG. 1 further depicts in phantom, the system 100 may further include first and second wavelength filters 113, 115 in front of the first and second photodetectors 112, 114, respectively. The first wavelength filter 113 is preferably configured to pass the first light and block the second light, while the second wavelength filter 115 is preferably configured to pass the second light and block the first light. The first and second wavelength filters 113, 115, if included, allow the position determination circuit 116 to be implemented with higher gain, which increases the sensitivity of the system 100.

Figure 2:
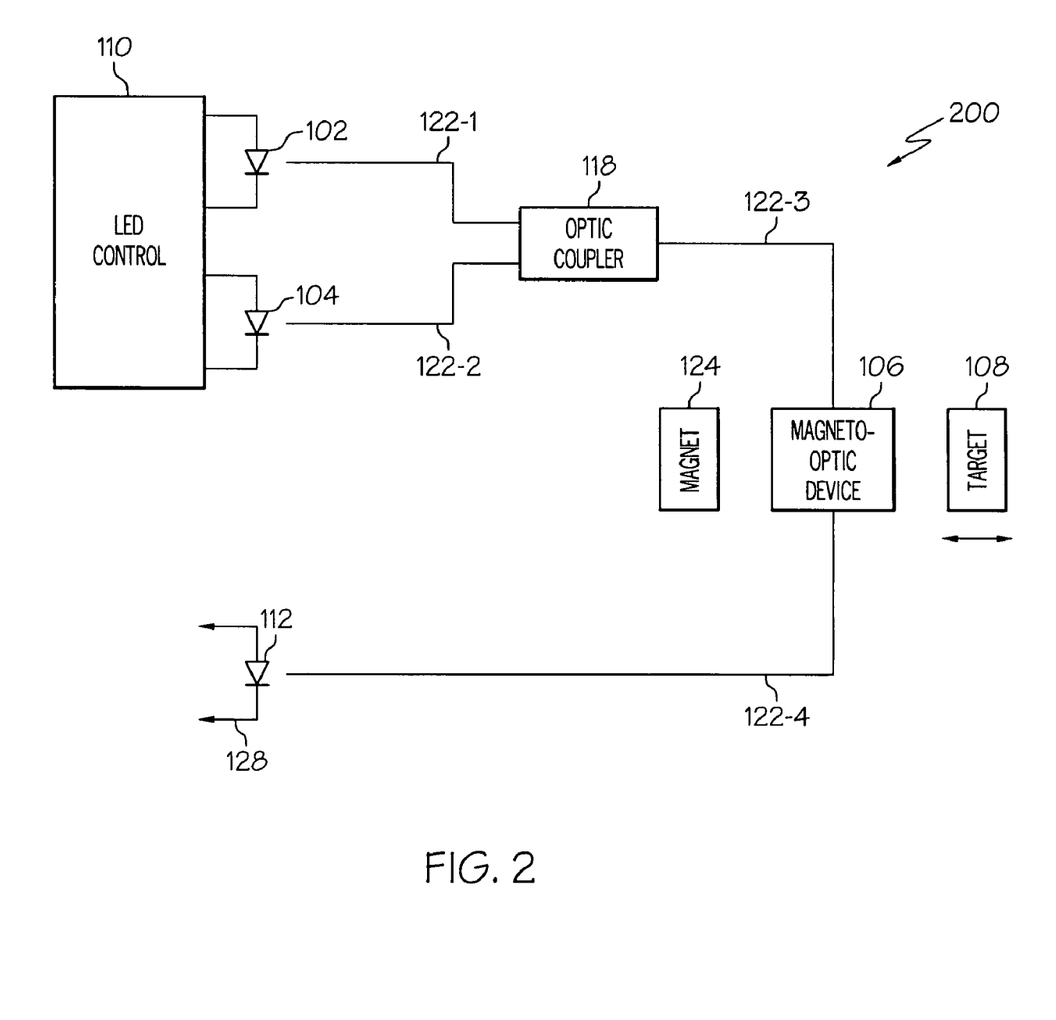
FIG. 2 is a functional block diagram of another exemplary embodiment of a photonic proximity sensor.

In addition to the various configurations and component alternatives described above, the photonic proximity sensor may be implemented without the second photodetector 114. This alternative embodiment is depicted in FIG. 2, and with reference thereto, will now be described. In doing so, it is noted that like numerals in FIG. 2 refer to like components of FIG. 1, and that detailed descriptions of these like components will not be repeated. The main difference between the sensor 200 of FIG. 2 and that of FIG. 1 is, as just noted, the absence of the second photodetector 114. As may be appreciated, and as FIG. 2 also depicts, because the second photodetector 114 is not included, the optic splitter 126 and the associated interconnecting fiber optic cables 122-5, 122-6 are also not included.

In this alternative embodiment, the linearly polarized first and second light that are emitted from the magneto-optic device 106 are both supplied to the first photodetector 112. The first photodetector 112 is responsive to the polarized first and light to supply the first signal 128. As with the embodiment of FIG. 1, the first signal 128 will have a first amplitude magnitude varies with the angle of rotation (β) of the polarized first and polarized second light. Though not depicted, the first signal 128 may be supplied to one or more additional circuits for further processing.

Having described the overall configurations of the photonic proximity sensors 100, 200 and the operation of each of the individual components that comprise the sensors 100, 200, a detailed description of their overall operations will now be provided. In doing so, it is assumed that the target 108 is coupled to a non-illustrated component that is movable between two positions—a first position and a second position. It will be appreciated that, however, that the sensors 100, 200 could be configured to sense more than two positions, and to even supply continuously variable position signals 134.

As was noted above, the first and second light sources 102, 104 emit first and second light, respectively, at different wavelengths. Moreover, at least in a particular preferred embodiment, the first and second light sources 102 are energized to emit the first and second light in pulses of equal duty cycles, but 180-degrees out of phase. In the embodiments of FIGS. 1 and 2, the first and second lights are transmitted through the optic coupler 118, via the fiber optic cables 122, and then to and through the magneto-optic device 106. In the embodiment of FIG. 1, the first and second lights are transmitted from the magneto-optic device 106 to the first and second photodetectors 112, 114, via the optic splitter 126 and fiber optic cables 122. In the embodiment of FIG. 2, however, the first and second lights are transmitted from the magneto-optic device 106 to the first photodetector 112, via the fiber optic cable 122-4.

In both of the depicted embodiments, the movement of the target 108 causes variations in the magnetic field in the magneto-optic device 106. As previously noted, these magnetic field variations affect the rotation angle (β) of the first light significantly more than the second light (and preferably does not affect the rotation angle of the second light at all). For purposes of this description it is assumed that when the target 108, and thus the component to which it is coupled, is in the first position, the polarized first light is rotated very little, if any, and is thus not significantly attenuated, if at all. Conversely, when the target 108 is in the second position, the polarized first light is rotated an angle that results in significant attenuation of the first light by the output polarizer 204.

Figure 5:
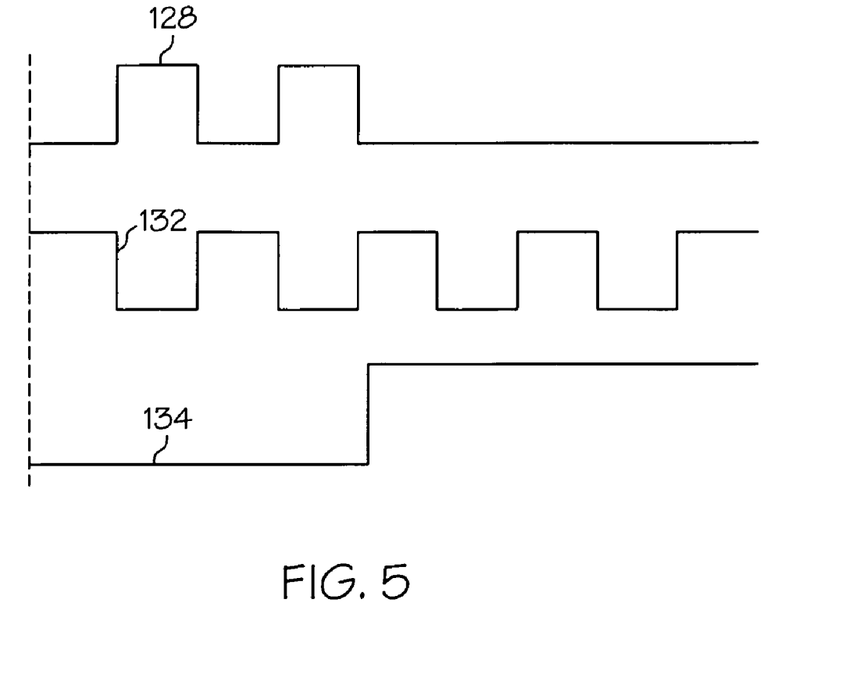
FIG. 5 depicts various signals generated within the sensor of FIG. 1.
Figure 6:
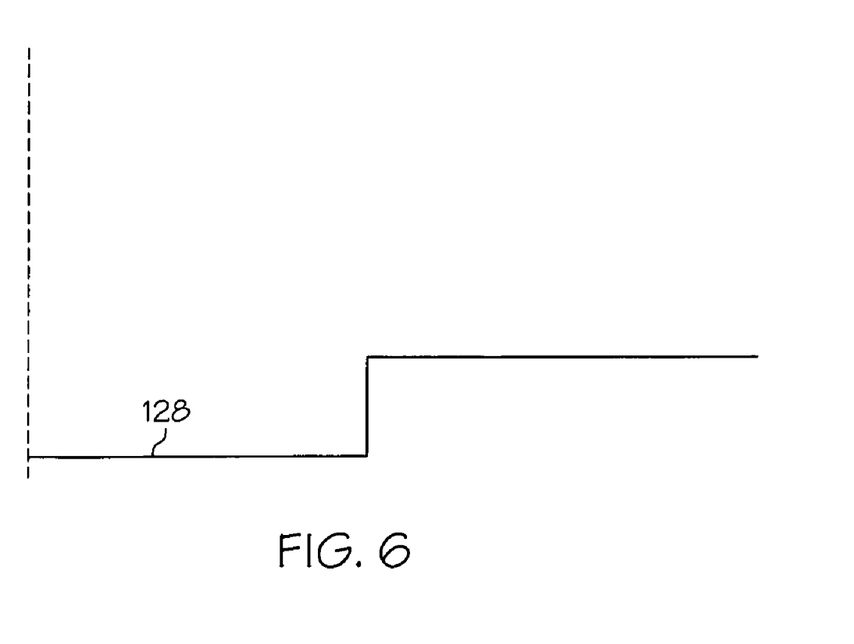
FIG. 6 depicts an output signal generated within the sensor of FIG. 2.

For the embodiment depicted in FIG. 1, and as shown more clearly in FIG. 5, when the target 108 is in the first position, the first signal 128 and the second signal 132, when summed in the position determination circuit 116, result in a logic-LOW position signal 134. Conversely, when the target 108 is in the second position, the first signal 128 and the second signal 132, when summed in the position determination circuit 116, result in a logic-HIGH position signal 134. For the embodiment depicted in FIG. 2, and as shown more clearly in FIG. 6, when the target 108 is in the first position, the first signal 128 is a logic-LOW signal. Conversely, when the target 108 is in the second position, the first signal 128 is a logic-HIGH signal.

Figure 7:
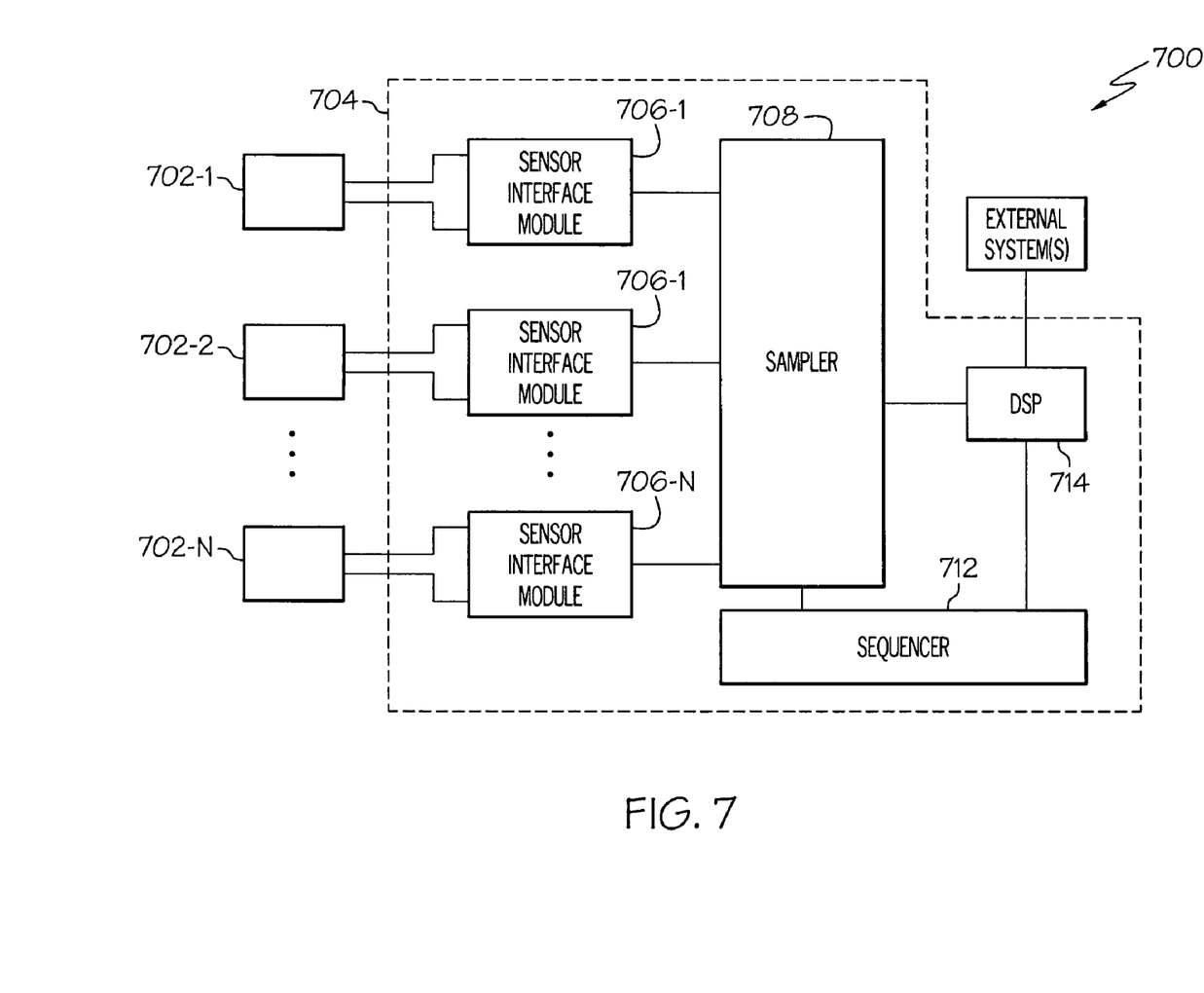
FIG. 7 depicts a photonic sensor system which may include the sensor of FIGS. 1 and 2.

The photonic proximity sensor 100, as well as various other photonic-based sensors, may be coupled to a common interface module to implement a photonic sensor system. An embodiment of such a system 700 is depicted in FIG. 7 and includes a plurality of photonic sensors 702 (e.g., 702-1, 702-2, 702-3, . . . 702-N) and an interface module 704. Preferably, each of the photonic sensors 702 is configured to sense a physical phenomenon that differs from the physical phenomenon sensed by at least one other photonic sensor 702. For example, the system 700 may include at least one of the just-described proximity sensors, at least one temperature sensor, at least one pressure sensor, etc. No matter the number and type of different phenomena that are sensed, each photonic sensor 702 includes a magneto-optic device 106 that is responsive to variations of a magnetic field, caused at least in part by the physical phenomenon it is configured to sense, to rotate polarized light.

The interface module 704 is coupled to each of the photonic sensors 702. The interface module 704 is responsive to at least the rotated polarized light received from each photonic sensor 702 to supply a plurality of signals representative of each physical phenomenon that is sensed. These signals may then be transmitted to external systems or devices for interpretation thereby. The interface module 704 may be variously configured, but in the depicted embodiment it includes a plurality of sensor interface modules 706 (e.g., 706-1, 706-2, 706-3, . . . 706-N), a sampler 708, a sequencer 712, and a processor 714.

The sensor interface modules 706 are each coupled to one of the photonic sensors 702 and may be individually configured, via suitable software, to control and process the sensor signals received therefrom at least substantially identically. The sampler 708, sequencer 712, and processor 714, operating according to generally well known techniques, sequentially sample and process the sensor signals supplied from the sensor interface modules 706, and supply the sampled and processed sensor signals to one or more external systems.

The photonic proximity sensor described herein is accurate, safe, and reliable, and is less susceptible to EMI and temperature variations, at least as compared to current devices.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A photonic proximity sensor, comprising:
   a first light source operable to emit first light of a first wavelength and at a first duty cycle;
   a second light source operable to emit second light of a second wavelength and at a second duty cycle and 180-degrees out of phase with the first light;
   an input polarizer coupled to receive the first light and the second light and configured to polarize the first light and the second light;
   a magneto-optic element coupled to the input polarizer to receive the polarized first light and the polarized second light, the magneto-optic element having greater sensitivity to the first wavelength than the second wavelength, and thereby being responsive to variations of a magnetic field to rotate the polarized first light more than the polarized second light;
   an output polarizer coupled to the magneto-optic element to receive the rotated and polarized first light and the polarized second light and configured to further polarize the first light and further polarize the second light;
   a target movable relative to the magneto-optic element to cause the variations of the magnetic field; and
   a first photodetector coupled to receive at least the further polarized first light and operable, in response thereto, to supply a first signal of a first amplitude magnitude that varies at least with the rotation of the further polarized first light.

2. The sensor of claim 1, further comprising:
   a second photodetector coupled to receive the further polarized second light and operable, in response thereto, to supply a second signal of a second amplitude magnitude; and
   a position determination circuit coupled to receive the first signal and the second signal and operable, in response thereto, to supply a position signal of a third amplitude magnitude representative of target position.

3. The sensor of claim 1, further comprising:
   an optic coupler coupled to between the first light source, the second light source, and the input polarizer.

4. The sensor of claim 3, further comprising:
   an optic splitter coupled between output polarizer, the first photodetector, and the second photodetector.

5. The sensor of claim 4, further comprising:
   a first fiber optic cable coupled between the optic coupler and the input polarizer.

6. The sensor of claim 5, further comprising:
   a second fiber optic cable coupled between the output polarizer and the optic splitter.

7. The sensor of claim 6, further comprising:
   a third fiber optic cable coupled between the first light source and the optic coupler; and
   a fourth fiber optic cable coupled between the second light source and the optic coupler.

8. The sensor of claim 7, further comprising:
   a fifth fiber optic cable coupled between the optic splitter and the first photodetector; and
   a sixth fiber optic cable coupled between the optic splitter and the second photodetector.

9. The sensor of claim 1, wherein the first duty cycle and the second duty cycle are equal.

10. The sensor of claim 1, further comprising:
    a magnet disposed adjacent the magneto-optic element to supply the magnetic field.

11. The sensor of claim 10, wherein the magnet is formed integrally with the target.

12. A photonic sensor, comprising:
    a first light source operable to emit first light of a first wavelength and at a first duty cycle;
    a second light source operable to emit second light of a second wavelength and at the first duty cycle and 180-degrees out of phase with the first light;
    an input polarizer coupled to receive the first light and the second light and configured to polarize the first light and the second light;
    a magneto-optic element coupled to the input polarizer to receive the polarized first light and the polarized second light, the magneto-optic element having greater sensitivity to the first wavelength than the second wavelength, and thereby being responsive to variations of a magnetic field to rotate the polarized first light more than the polarized second light;
    an output polarizer coupled to the magneto-optic element to receive the rotated and polarized first light and the polarized second light and configured to further polarize the first light and further polarize the second light;
    a magnet disposed adjacent the magneto-optic element to supply the magnetic field;
    a target movable relative to the magneto-optic device and the magnet to cause the variations of the magnetic field;
    a first photodetector coupled to receive the further polarized first light and operable, in response thereto, to supply a first signal of a first amplitude magnitude that varies with the rotation of the polarized first light;
    a second photodetector coupled to receive the further polarized second light and operable, in response thereto, to supply a second signal of a second amplitude magnitude;
    a position determination circuit coupled to receive the first signal and the second signal and operable, in response thereto, to supply a position signal of a third amplitude magnitude representative of target position.

13. The sensor of claim 12, further comprising:
    an optic coupler coupled to between the first light source, the second light source, and the input polarizer.

14. The sensor of claim 13, further comprising:
    an optic splitter coupled between the output polarizer, the first photodetector, and the second photodetector;
    a first wavelength filter coupled between the optic splitter and the first photodetector; and
    a second wavelength filter coupled between the optic splitter and the second photodetector.

15. The sensor of claim 14, further comprising:
    a first fiber optic cable coupled between the optic coupler and the input polarizer; and a second fiber optic cable coupled between the output polarizer and the optic splitter.

16. The sensor of claim 15, further comprising:
a third fiber optic cable coupled between the first light source and the optic coupler;
a fourth fiber optic cable coupled between the second light source and the optic coupler;

a fifth fiber optic cable coupled between the optic splitter and the first photodetector; and
a sixth fiber optic cable coupled between the optic splitter and the second photodetector.

* * * * *